United States Patent

Toratani

[11] 4,217,382
[45] Aug. 12, 1980

[54] EDGE-CLADDING GLASS OF DISC LASER GLASS

[75] Inventor: Hisayoshi Toratani, Hidakamachi, Japan

[73] Assignee: Hoya Corporation, Tokyo, Japan

[21] Appl. No.: 23,992

[22] Filed: Mar. 26, 1979

[30] Foreign Application Priority Data

Jun. 20, 1978 [JP] Japan .................... 53-74575

[51] Int. Cl.² .......... B32B 17/06; C03C 3/16; H01S 3/17
[52] U.S. Cl. ............... 428/66; 106/47 R; 106/47 Q; 331/94.5 E; 428/194; 428/426; 428/427
[58] Field of Search ............ 106/47 R, 47 Q; 428/426, 427, 66, 194; 331/94.5 E

[56] References Cited

U.S. PATENT DOCUMENTS

| | | | |
|---|---|---|---|
| 3,885,974 | 5/1975 | Asahara et al. | 106/47 Q |
| 3,923,527 | 12/1975 | Matsuura et al. | 106/47 R |
| 3,946,128 | 3/1976 | Spanondis | 106/47 Q |
| 3,966,448 | 6/1976 | Asahara et al. | 106/47 Q |
| 3,988,697 | 10/1976 | Cooley | 106/47 R |
| 4,060,422 | 11/1977 | Asahara | 106/47 Q |
| 4,110,245 | 8/1978 | Yamashita | 106/47 Q |
| 4,120,814 | 10/1978 | Izumiteni et al. | 106/47 Q |

Primary Examiner—O. R. Vertiz
Assistant Examiner—Mark Bell
Attorney, Agent, or Firm—Sughrue, Rothwell, Mion, Zinn and Macpeak

[57] ABSTRACT

A glass for edge-cladding a disc laser glass, comprising, in mol%, followed in parentheses by wt % value,

| | | |
|---|---|---|
| $P_2O_5$ | 46–63, | (64–76) |
| $Al_2O_3$ | 4–8, | (3.5–7.5) |
| $B_2O_3$ | 0–5, | (0–3.0) |
| $K_2O$ | 2–20, | (2.5–16.5) |
| $Na_2O$ | 0–15, | (0–8.5) |
| $Li_2O$ | 0–14, | (0–3.5) |
| $K_2O + Na_2O + Li_2O$ | 18–30, | (11.5–20.5) |
| $CuO$ | 2–20, | (1.4–13.5) |
| $ZnO$ | 0–15, | (0–11.5) |
| $MgO$ | 0–5, | (0–2.0) |
| | | and |
| $CuO + ZnO + MgO$ | 7–20. | (4.7–13.5). |

2 Claims, 1 Drawing Figure

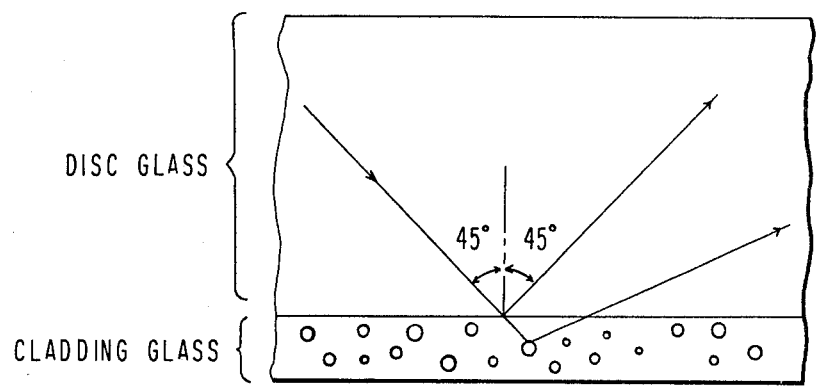

EDGE-CLADDING GLASS OF DISC LASER GLASS

BACKGROUND OF THE INVENTION

1. Field of the Invention

This invention relates to an edge-cladding glass for a disc laser glass. More particularly, it relates to an edge-cladding glass for a disc laser glass, which has a low fusion temperature, a high thermal expansion coefficient and a high absorption coefficient in the vicinity of the central wavelength of laser light.

2. Description of the Prior Art

It is known that when spontaneous emission light generated in a disc laser glass in which energy has been accumulated by the pumping of a Xe flash lamp is reflected and scattered at disc edges and amplified such that the gain exceeds the loss; oscillation, known as parasitic oscillation, occurs. When oscillation occurs, the energy accumulated is consumed instantaneously. This phenomenon can be prevented by surrounding the circumferencial portion of the disc with a medium having reduced reflection and scattering and capable of absorbing the laser light (e.g., the glass of this invention) so that the spontaneous emission light cannot be reflected and scattered at disc edges. This contrivance is known in the art as "edge cladding" and is discribed in U.S. Pat. Nos. 3,885,974 and 3,966,448.

A general method of edge-cladding comprises mixing a low fusion temperature glass powder with a dispersing agent to form a slurry, coating the slurry on the edge of the disc laser glass, and heat-treating the coated glass at a temperature below the temperature at which the disc glass is softened and deformed, to thereby melt-bond the low fusion temperature glass to the edge of the disc glass. This method tends to leave a number of bubbles in the clad glass, which increase considerably the reflection and scattering of spontaneous emission light.

SUMMARY OF THE INVENTION

An object of this invention is to provide a glass for edge-cladding having a low fusion temperature, a high expansion co-efficient, and a high absorption coefficient in the vicinity of the central wavelength (1.051 to 1.054μ, particularly 1.052μ) of laser light.

When a disc glass is edge-cladded with the glass of this invention, residual bubbles are reduced, and the reflection and scattering of spontaneous emission light can be maintained low.

BRIEF DESCRIPTION OF THE ACCOMPANYING DRAWING

The FIGURE shows a state of reflection and scattering of a glass on which the edge-cladding glass of this invention has been coated.

DETAILED DESCRIPTION OF THE INVENTION

The disc glass to which the edge-cladding glass of this invention is applied is a fluorophosphate glass which has a coefficient $\alpha$ of thermal expansion ranging about $145 \times 10^{-7}$ to about $175 \times 10^{-7}/°C$. (100°-200° C.), a transition point Tg ranging about 380° to about 450° C., and a refractive index [nd] ranging from about 1.44 to about 1.48. Such a glass is described in U.S. Patent application Ser. No. 819,440 filed July 27, 1977 issued Oct. 17, 1978, as U.S. Pat. No. 4,120,814.

The edge-cladding glass of this invention comprises, in mol%, followed in parentheses by wt% value,

| | mol% | (wt%) |
|---|---|---|
| $P_2O_5$ | 46–63, | (64–76) |
| $Al_2O_3$ | 4–8, | (3.5–7.5) |
| $B_2O_3$ | 0–5, | (0–3.0) |
| $K_2O$ | 2–20, | (2.5–16.5) |
| $Na_2O$ | 0–15, | (0–8.5) |
| $Li_2O$ | 0–14, | (0–3.5) |
| $K_2O + Na_2O + Li_2O$ | 18–30, | (11.5–20.5) |
| CuO | 2–20, | (1.4–13.5) |
| ZnO | 0–15, | (0–11.5) |
| MgO | 0–5, | (0–2.0) and |
| CuO + ZnO + MgO | 7–20. | (4.7–13.5). |

$P_2O_5$ the main component of the glass, decreases the softening point of the edge-cladding glass. If the amount of $P_2O_5$ is 46 mol% or less, the edge-cladding glass tends to devitrify. If the amount of $P_2O_5$ is 63 mol% or more, residual bubbles increase after fusion process.

$Al_2O_3$ is required in an amount of 4 mol% or more to improve the devitrification resistance and chemical durability of the edge-cladding glass. When the amount of $Al_2O_3$ exceeds 8 mol%, the edge-cladding glass has a high softening point.

$B_2O_3$ is effective to increase the devitrification resistance of the edge-cladding glass. The effect of $B_2O_3$ does not increase even when the amount of $B_2O_3$ exceeds 5 mol%, but rather the softening point of the edge-cladding glass increases. Accordingly $B_2O_3$ is used in amounts up to 5 mol% such that the softening point for the edge-cladding glass is below the temperature at which the disc glass is softened.

The alkali metal oxides are essential to decrease the softening point of the edge-cladding glass and to increase the coefficient of thermal expansion of the edge-cladding glass. The total amount of $K_2O + Na_2O + Li_2O$ must be 18 mol% or more, but if the total amount exceeds 30 mol%, the edge-cladding glass tends to devitrify.

$K_2O$ improves the devitrification resistance of the edge-cladding glass, and is required in an amount of 2 mol% or more. The $K_2O$ is also the most effective component to increase the coefficient of thermal expansion of the edge-cladding glass. The suitable upper limit on the amount of $K_2O$ is 20 mol% because $K_2O$ gives the highest softening point among the alkali metal oxides and the chemical durability thereof is low.

$Na_2O$ and $Li_2O$, which can replace a portion of $K_2O$, are effective to adjust the coefficient of thermal expansion of the edge-cladding glass to that of the disc glass. Since $Na_2O$ and $Li_2O$ give lower softening points than that of $K_2O$, they are used in an amount of 0 to 15 mol%, and 0 to 14 mol%, respectively.

CuO has a high absorption in a wavelength region of 0.7 to 1.3μ, and is essential to absorb laser light. The amount of CuO must be 2 mol% or more so that the edge-cladding glass has a sufficient absorption at an ordinary thickness e.g., about 0.2 to 1.0 mm. Since CuO gives a relatively low softening point and tends to reduce residual bubbles after fusion process, such can be incorporated effectively in a considerable amount. The effect however scarcely changes when the amount of CuO exceeds 20 mol%.

ZnO gives a relatively low softening point and exhibits properties similar to CuO, as such ZnO can replace a portion of CuO. In particular, a glass having a high CuO content tends to undergo thermal damage by a Xe flash lamp. In such a case, ZnO is an effective substitute for CuO. The suitable upper limit of the amount of ZnO is 15 mol% because ZnO tends to increase residual bubbles and the use thereof in too large amount increases reflection and scattering of laser light.

Similar to ZnO, MgO can be used in place of a portion of CuO. The suitable amount of MgO is 5 mol% or less because MgO increases the softening point of the edge-cladding glass.

The total amount of CuO+ZnO+MgO should be 7 to 20 mol% so as to retain the chemical durability of the edge-cladding glass.

Edge-cladding glasses in accordance with the present invention preferably have a fusion temperature of about 400° to 480° C., an expansion coefficient of about $130 \times 10^{-7}$ to $170 \times 10^{-7}/°C.$, and the coefficient of adsorption preferably ranges from 20 to 250 $cm^{-1}$.

Examples of the glass of this invention along with their thermal properties, absorption coefficients at $1.052\mu$ [$k_{1.052}(cm^{-1})$] and the magnitude R(%) of reflection and scattering after fusion process are shown below. Each component is shown by mol% and (in parentheses below the mol% value) in wt%.

EXAMPLES

| | Example No. | | | | | | | |
|---|---|---|---|---|---|---|---|---|
| | 1 | 2 | 3 | 4 | 5 | 6 | 7 | 8 |
| $P_2O_5$ | 49.29 | 62.42 | 51.43 | 51.43 | 53.06 | 55.71 | 57.42 | 54.69 |
| | (64.85) | (76.00) | (65.88) | (65.77) | (67.47) | (68.68) | (69.62) | (69.00) |
| $Al_2O_3$ | 6.10 | 5.56 | 4.43 | 4.43 | 6.63 | 6.96 | 7.17 | 7.81 |
| | (5.76) | (4.86) | (4.08) | (4.08) | (6.06) | (6.16) | (6.25) | (7.08) |
| $B_2O_3$ | 2.05 | 2.60 | 2.14 | 2.14 | 2.21 | 2.32 | 2.39 | — |
| | (1.32) | (1.55) | (1.34) | (1.34) | (1.38) | (1.40) | (1.42) | (—) |
| CuO | 15 | 7 | 12 | 2 | 4.76 | 5 | 15 | 15 |
| | (11.06) | (4.78) | (8.61) | (1.43) | (3.39) | (3.45) | (10.19) | (10.60) |
| $K_2O$ | 11.78 | 9.60 | 12.50 | 12.50 | 14.29 | 13.5 | 10.8 | 9.64 |
| | (10.28) | (7.76) | (10.63) | (10.61) | (12.06) | (11.04) | (8.69) | (8.07) |
| $Na_2O$ | 7.89 | 6.41 | 8.33 | 8.33 | 14.29 | 9 | 7.22 | 6.43 |
| | (4.53) | (3.41) | (4.65) | (4.65) | (7.93) | (4.84) | (3.82) | (3.54) |
| $Li_2O$ | 7.89 | 6.41 | 4.17 | 4.17 | | | | 6.43 |
| | (2.18) | (1.64) | (1.12) | (1.12) | (—) | (—) | (—) | (1.71) |
| ZnO | | | 5 | 15 | | 5 | | |
| | (—) | (—) | (3.67) | (11.00) | (—) | (3.53) | (—) | (—) |
| MgO | | | | | 4.76 | 2.51 | | |
| | (—) | (—) | (—) | (—) | (1.72) | (0.88) | (—) | (—) |
| Tg (°C.) | 356 | 340 | 333 | 326 | 366 | 379 | 378 | 374 |
| Sp (°C.) | 395 | 385 | 373 | 367 | 407 | 423 | 421 | 416 |
| $\alpha(10^{-7}/°C.)$ | 152 | 147 | 155 | 158 | 160 | 163 | 150 | 141 |
| $k_{1.052}(cm^{-1})$ | 180 | 84 | 144 | 25 | 57 | 60 | 180 | 180 |
| R (%) | 0.09 | 0.14 | 0.15 | 0.19 | 0.15 | 0.18 | 0.17 | 0.17 |
| CuO + ZnO + MgO | (11.06) | (4.78) | (12.28) | (12.43) | (5.11) | (7.86) | (10.19) | (10.60) |
| $K_2O$ + $Na_2O$ + LiO | (16.99) | (12.81) | (16.4) | (16.38) | (19.99) | (15.86) | (12.51) | (13.32) |

| | Example No. | | | | | | |
|---|---|---|---|---|---|---|---|
| | 9 | 10 | 11 | 12 | 13 | 14 | 15 |
| $P_2O_5$ | 52.46 | 55.71 | 56.71 | 56.71 | 55.71 | 53.57 | 55.71 |
| | (67.59) | (70.11) | (73.72) | (74.15) | (66.70) | (67.46) | (68.18) |
| $Al_2O_3$ | 5.58 | 4.96 | 5.96 | 5.96 | 6.96 | 6.70 | 6.96 |
| | (5.16) | (4.48) | (5.56) | (5.60) | (5.99) | (6.06) | (6.12) |
| $B_2O_3$ | 4.46 | 0.32 | 2.32 | 2.33 | 2.32 | 2.23 | 2.32 |
| | (2.82) | (0.20) | (1.48) | (1.49) | (1.36) | (1.38) | (1.39) |
| CuO | 15 | 19 | 7 | 7 | 15 | 15 | 15 |
| | (10.83) | (13.40) | (5.10) | (5.13) | (10.06) | (10.58) | (10.29) |
| $K_2O$ | 9.64 | 8.57 | 5.33 | 3.0 | 20 | 7.5 | 12 |
| | (8.24) | (7.16) | (4.60) | (2.60) | (15.89) | (6.27) | (9.75) |
| $Na_2O$ | 6.43 | 5.72 | 11.34 | 14.0 | | 15 | 8 |
| | (3.62) | (3.14) | (6.44) | (7.99) | (—) | (8.25) | (4.28) |
| $Li_2O$ | 6.43 | 5.72 | 11.34 | 11.0 | | | |
| | (1.74) | (1.52) | (3.10) | (3.03) | (—) | (—) | (—) |
| ZnO | | | | | | | |
| MgO | | | | | | | |
| Tg (°C.) | 358 | 353 | 328 | 323 | 383 | 385 | 371 |
| Sp (°C.) | 406 | 394 | 373 | 369 | 429 | 419 | 416 |
| $\alpha(10^{-7}/°C.)$ | 146 | 145 | 151 | 160 | 150 | 144 | 140 |
| $k_{1.052}(cm^{-1})$ | 180 | 228 | 84 | 84 | 180 | 180 | 180 |
| R (%) | 0.18 | 0.16 | 0.10 | 0.12 | 0.22 | 0.19 | 0.12 |
| CuO + ZnO + MgO | (10.83) | (13.40) | (5.10) | (5.13) | (10.06) | (10.58) | (10.29) |
| $K_2O$ + $Na_2O$ + LiO | (13.6) | (11.82) | (14.14) | (13.62) | (15.89) | (14.52) | (14.03) |

The magnitude of reflection and scattering is measured as illustrated in the accompanying drawing. That is, light ray is emitted from the side of the disc glass against the interface between the disc glass and the cladding glass at an angle of incidence of 45°. The light ray is partly reflected at the interface, and the remainder advances through the cladding glass and is absorbed there. When bubbles are present inside the cladding glass, the light ray scattered by the bubbles is not completely absorbed, but reflected. This results in a reflecting of light rays in random directions with regard to an angle of incidence of 45°.

On the other hand, if there is no cladding glass, the light which falls upon the glass at an angle of incidence of 45° will be totally reflected at the interface between the cladding glass and the air.

Where the intensity of this reflecting light is represented by $I_o$ and the intensity of the above-described reflected and scattered light is represented by I, the magnitude is calculated by $R(\%) = I/I_o \times 100$.

In the edge-cladding glass of this invention, the alkali metal oxides can be replaced by the alkali metal fluorides. Since flourine mostly volatilizes during melting and scarcely remains in the glass, the fluorine does not greatly affect the various properties of the edge-cladding glass.

When the alkali metal oxides of the glass of Example 15 are changed to alkali metal fluorides, the properties of the resulting glass are as follows:

| Tg (°C.) | Sp (°C.) | $\alpha(10^{-7}/°C.)$ | $k_{1.052}(cm^{-1})$ | R (%) |
|---|---|---|---|---|
| 370 | 422 | 142 | 180 | 0.155 |

As starting materials for the edge-cladding glass of this invention phosphoric anhydride, ortho-phosphoric acid, alumina, aluminum hydroxide, boric anhydride, boric acid, copper oxide, potassium carbonate, sodium carbonte, lithium carbonate, potassium fluoride, sodium fluoride, lithium fluoride, zinc oxide, and magnesium carbonate are useful. By mixing the starting materials in the appropriate amounts and melting at about 1,100° to about 1,200° C. in a crucible the edge-cladding glass of this invention can be produced.

While the invention has been described in detail and with reference to specific embodiments thereof, it will be apparent to one skilled in the art that various changes and modifications can be made therein without departing from the spirit and the scope thereof.

What is claimed is:
1. A glass for edge-cladding a disc laser glass, consisting essentially of, in mol%,

| | |
|---|---|
| $P_2O_5$ | 46–63, |
| $Al_2O_3$ | 4–8, |
| $B_2O_3$ | 0–5, |
| $K_2O$ | 2–20, |
| $Na_2O$ | 1–15, |
| $Li_2O$ | 0–14, |
| $K_2O + Na_2O + Li_2O$ | 18–30, |
| CuO | 2–20, |
| ZnO | 0–15, |
| MgO | 0–5, and |
| CuO + ZnO + MgO | 7–20. |

2. An edge-clad disc laser glass comprising a disc glass having a coefficient $\alpha$ of thermal expansion ranging about $145 \times 10^{-7}$ to about $175 \times 10^{-7}/°C.$ (100°–200° C.), a transition point Tg ranging about 380° to about 450° C., and a refractive index (nd) ranging from about 1.44 to about 1.48, the circumferential portion of which is surrounded by a medium having reduced reflection and scattering and capable of absorbing laser light, consisting essentially of, in mol%:

| | |
|---|---|
| $P_2O_5$ | 46–63, |
| $Al_2O_3$ | 4–8, |
| $B_2O_3$ | 0–5, |
| $K_2O$ | 2–20, |
| $Na_2O$ | 1–15, |
| $Li_2O$ | 0–14, |
| $K_2O + Na_2O + Li_2O$ | 18–30, |
| CuO | 2–20, |
| ZnO | 0–15, |
| MgO | 0–5, and |
| CuO + ZnO + MgO | 7–20. |

* * * * *